April 22, 1924.

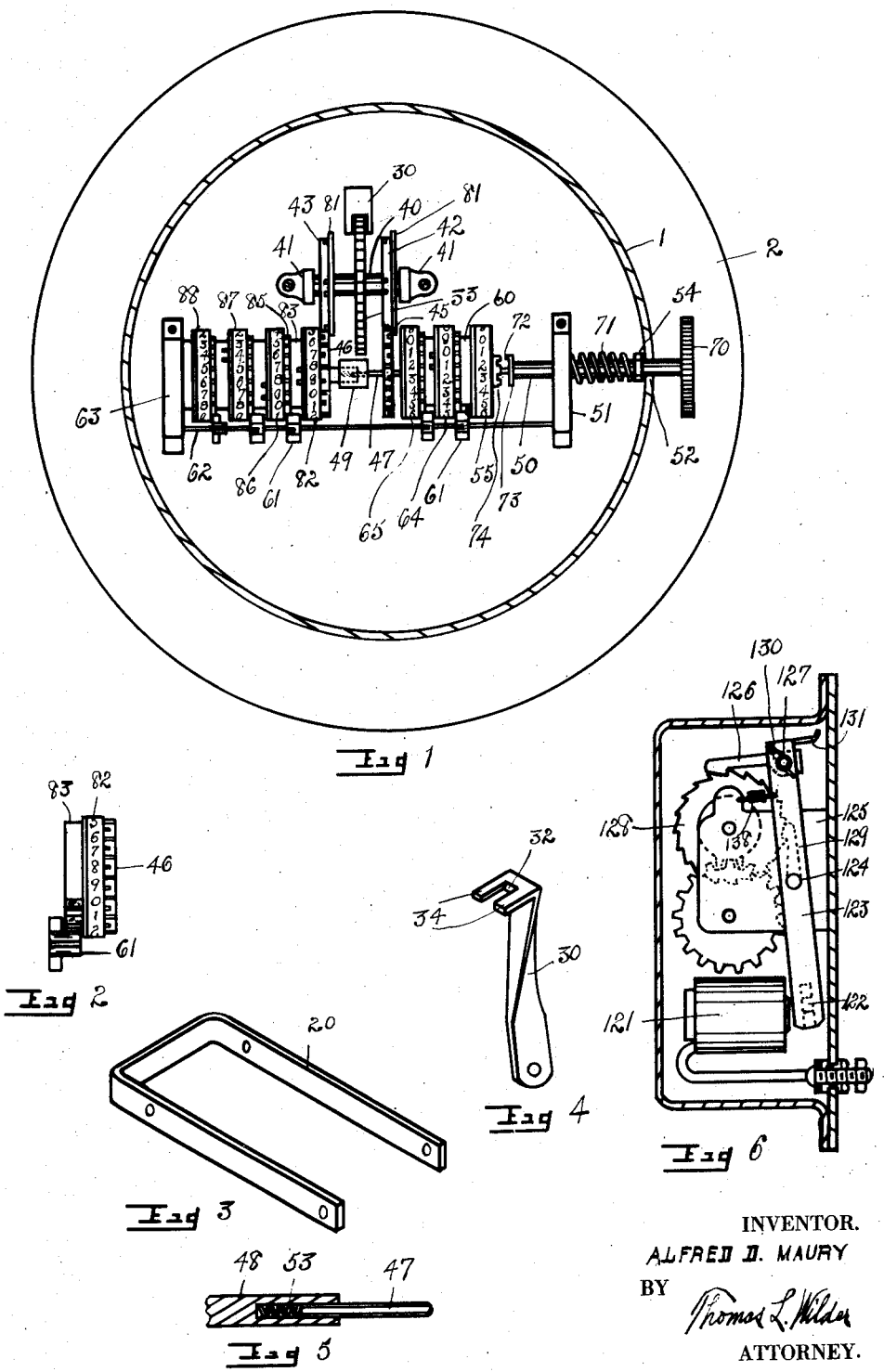

A. D. MAURY

METER

Filed March 20, 1918

INVENTOR.
ALFRED D. MAURY
BY
Thomas L. Wilder
ATTORNEY.

April 22, 1924.                                                    1,491,777
                          A. D. MAURY
                            METER
                    Filed March 20, 1918           3 Sheets-Sheet 3
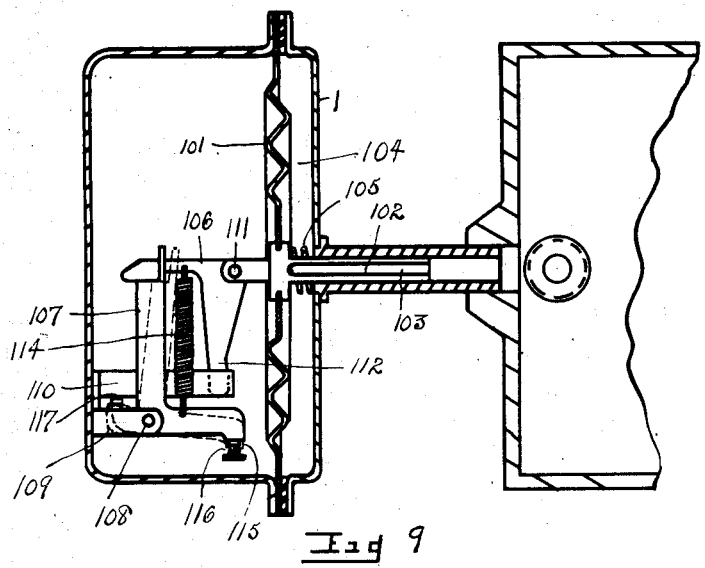
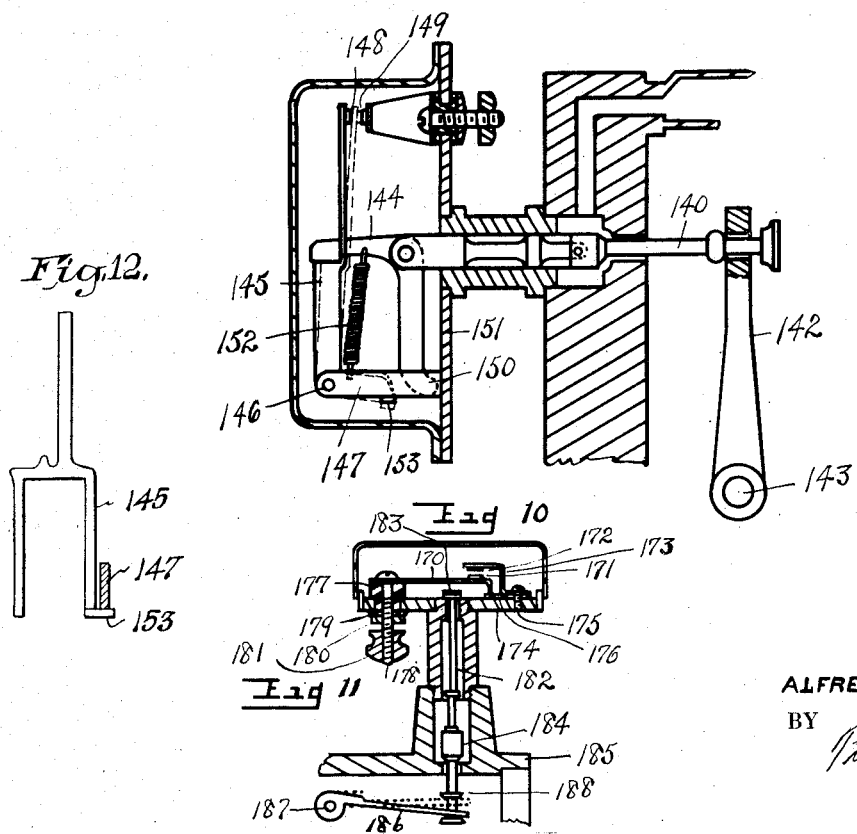
INVENTOR.
ALFRED D. MAURY
BY
Thomas L. Wilder
ATTORNEY.

Patented Apr. 22, 1924.

1,491,777

UNITED STATES PATENT OFFICE.

ALFRED D. MAURY, OF ILION, NEW YORK, ASSIGNOR OF ONE-FOURTH TO FRANK J. BOWEN AND ONE-FOURTH TO WILLIAM F. CARROLL, OF UTICA, NEW YORK.

METER.

Application filed March 20, 1918. Serial No. 223,495.

*To all whom it may concern:*

Be it known that I, ALFRED D. MAURY, a citizen of the United States, residing at Ilion, in the county of Herkimer and State of New York, have invented certain new and useful Improvements in Meters, of which the following is a specification, reference being had therein to the accompanying drawing.

My invention relates to a meter and I declare the following to be a full, clear, concise and exact description thereof sufficient to enable anyone skilled in the art to which it appertains to make and use the same, reference being had to the accompanying drawings in which like reference characters refer to like parts throughout the specification.

The object of the invention is to provide a meter for registering the quantity of gasoline used in running an automobile. The meter is arranged to register the quantity of gasoline used in running small trips or the amount used per day and also to register the quantity used during the season. To this end the meter is equipped with an indicating device, and mechanism for actuating the same. This latter mechanism is attached to any vacuum tank, such as now being used to effect a constant flow of gasoline to the carbureter, and embodies a diaphragm which is periodically moved back and forth as the vacuum is made or released in the vacuum tank after each given quantity of gasoline passes from one chamber to the other in said tank. The diaphragm is intermediately connected with a pawl that engages the teeth of a ratchet to which the movement of the diaphragm is communicated through the pawl.

The object will be understood by referring to the drawings in which:

Fig. 1 is a plan view, showing the casing cut away for a clearer inspection of the indicating mechanism;

Fig. 2 is an enlarged detail view of certain gears employed;

Fig. 3 is an enlarged detail view of a U-shaped lever employed;

Fig. 4 is an enlarged perspective view of a pawl employed;

Fig. 5 is an enlarged sectional view of a fragment of a shaft, showing other parts immediately connected therewith, which parts are employed in the indicating mechanism of the device;

Fig. 6 is an elevational view of a modified form of mechanism for actuating the indicating device employed, the casing being cut away;

Fig. 9 is an elevation showing certain modifications of the device, the casing being cut away;

Fig. 10 is another elevation showing certain modifications, the casing and other parts being sectioned;

Fig. 11 is an elevation showing certain modifications of the device, the casing being cut away;

Fig. 12 is a detail view showing a plan of a U-shaped bell crank lever employed.

Figure 7:
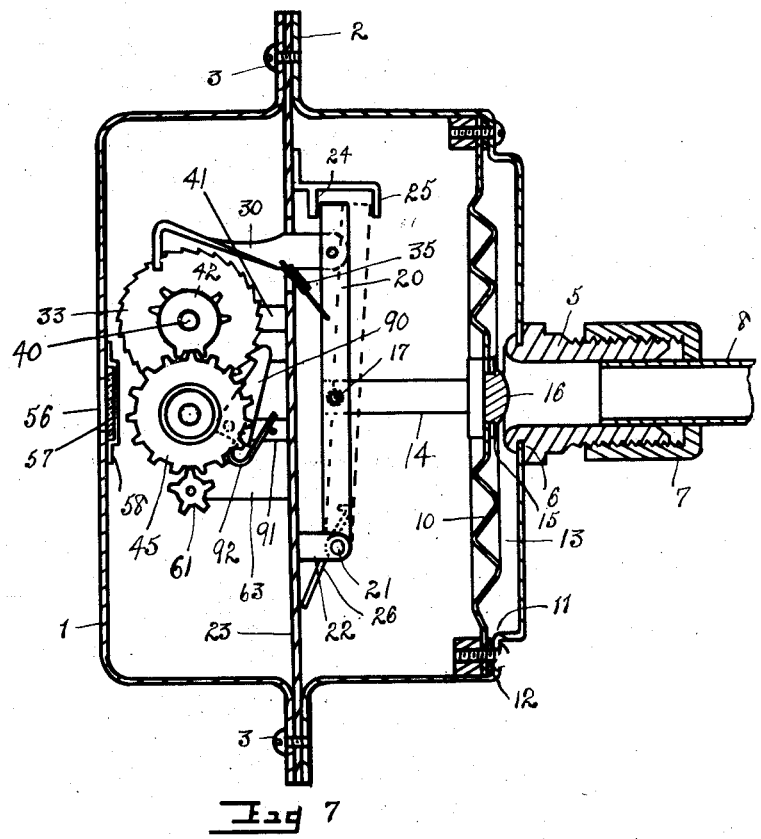
Fig. 7 is an elevation of the device, showing the casing cut away for the inspection of the interior.

Referring more particularly to the drawings, the meter embodies an annular casing —1— made in two parts having upturned contiguous edges joined together at 2 by a plurality of bolts 3. An opening is made in the casing for the disposition of the spout or member 5. The member 5 is provided with a countersunk annular recess at 6 for the reception of the adjacent edge of the casing —1—. The outer or free end of the member 5 is threaded for the mounting of a gland or stuffing box 7 that is adapted to prevent any leakage at the junction of the pipe 8 with the member 5.

The pipe 8 leads to any well known construction of vacuum tank, not here shown, that is adapted to cause an even uninterrupted flow of gasoline to the carburetter, such as shown in the Stewart system. In the Stewart system, the vacuum tank is equipped with two chambers, an upper and lower chamber. The gasoline is sucked into the upper chamber from the main supply tank with which it is connected by a pipe, by the intake stroke of the pistons of the engine. While this suction is going on the same will effect a drawing inward of the diaphragm 10, which diaphragm is mounted on the casing —1—, the same having an annular shoulder at 11 for the purpose. A gasket 12 composed of rubber, cork, paper or other suitable material is interposed between the surface of the casing —1— and the diaphragm 10 to make the chamber 13 air tight.

The diaphragm 10 is connected in an air tight manner with a stud 14 by a washer 15 that is held in place by the shoulder formed by riveting over the head 16 of the stud 14. The opposite end of the stud 14 has a hole for the projection of a shaft 17 which is mounted crosswise to the U-shaped lever 20. The stud 14 has a loose bearing on the shaft 17. The free ends of the U-shaped lever 20 are fulcrumed upon the shaft 21 mounted to turn within bearings in the brackets 22—22 that are fastened to the partition 23. The stops 24 and 25 are branched from a member that is fastened to the partition 23, and are intended to limit the oscillation of the U-shaped lever 20 upon its fulcrum 21. The U-shaped lever 20 is held normally in the full line position illustrated in Fig. 7 by a spring 26 wound about the shaft 21 and having one end hooked about one side of the U-shaped lever 20 and the other resting on the surface of the partition 23.

A pawl 30 is fulcrumed upon a shaft 31 that has bearings in the closed end of the U-shaped lever 20. The free end of the pawl 30 has a tooth 32 adapted to engage the teeth of the ratchet 33. The tooth 32 is held from lateral displacement by the guides 34—34 formed integral with the end of the pawl 30 and contiguous with the tooth 32. A spring 35 that has one end attached to the pawl 30 and the other to the lever 20 holds the tooth 32 of the pawl 30 normally in contact with the teeth of the ratchet 33.

The ratchet 33 is mounted to turn with a shaft 40 that has bearings in the brackets 41—41, fastened to the partition 23. The mutilated or interrupted gears 42 and 43 are mounted to turn with the shaft 40 and are adapted to mesh with the gears 45 and 46 respectively. The gear 45 is fixed to revolve with the shaft 47 that has a loose bearing, so as to revolve therein, at one end in the hollow portion of the shaft 48, which is supported in the bearing stand 49. At the other end, the shaft 47 has a loose bearing, so as to revolve therein, in the hollow portion of the shaft 50. The shaft 50 has bearings in the bracket stand 51 and in the casing —1— at 52. A coiled spring 53 is disposed within the hollow portion of the shaft 48, whereby to normally push the shaft 47 outwardly from the chamber in the shaft 48 and thereby urge the gear 45 into mesh with the mutilated gear 42. The action of the spring 53 in pushing outwardly on the shaft 47 is offset by the collar 54 fixed to the shaft 50 in which the end of the shaft 47 rests. The collar 54 bears against the surface of the casing —1— to limit the thrust of the spring 53.

Besides the gear 45, an indicator wheel 55 is mounted to turn with the shaft 47. The indicator wheel 55 has the digits from 0 to 9 marked upon its periphery, so that each time the gear 45 is actuated, the indicator wheel 55 will be actuated to bring a digit before the inspection opening 56 that is protected by the glass 57 held in place by the brackets 58 secured to the casing —1—. The wheel 55 or units wheel has formed integral therewith a gear 60 equipped with two teeth adapted to form a space that will mesh with a tooth of the pinion 61 which is mounted to turn independently upon the shaft 62 having bearings in the bracket stands 51 and 63. The pinion 61 is also in mesh with the tens indicating wheel 64 with the digits 0 to 9 marked upon its periphery. The wheel 64 is mounted to revolve independently of the shaft 47 and is actuated thereon through the space of one digit each time the units wheel 55 makes one complete revolution. Likewise, the hundreds wheel 65 having the digits 0 to 9 marked upon its periphery is mounted to turn independently of the shaft 47 and is actuated through the space of one digit each time the tens wheel 64 makes one complete revolution.

The wheels 55, 64, 65 can be reset to zero by pressing inward on the handle 70 and against the tension of the coiled spring 71, disposed about the shaft 50 between the collar 54 and the bracket stand 51, to move the shafts 50 and 47 in the same direction, whereupon, the gear 45 will be demeshed from the mutilated gear 42. Thereupon, the tooth 72 of the disk 73 formed integral with the shaft 50 will engage a tooth space of the crown gear 74. The indicator wheels 55, 64 and 65 can be turned now freely in either direction and reset to zero position. Immediately the pressure on the handle 70 is released, the coiled spring 71 will urge the shaft 50 back to normal position with the collar 54 bearing against the casing —1— and the coiled spring 53 will urge the shaft 47 and gear 45 back into mesh with the mutilated gear 42 when turned at the proper angle.

The mutilated gear wheel 43 which also revolves with the ratchet 33 meshes with the teeth of the gear 46 mounted to revolve independently of the shaft 48. The mutilated gear wheels 42 and 43 are provided each with a guide flange 81 adapted to aid in holding said gears in mesh with the gears 45 and 46 respectively. The gear 46 is formed to turn with the units indicator wheel 82 having the digits 0 to 9 marked upon its periphery. The wheel 82 is mounted to turn freely upon the shaft 48. A gear 83 having two teeth to form a space adapted to engage a tooth of the pinion 61 is made integral with the wheel 82. The pinion 61 is mounted to turn independently upon the shaft 62 and is in mesh with the gear 85 integral with the tens wheel 86 having the digits 0 to 9 marked upon its periphery. The wheel 86 will turn, therefore, through the space of one digit each time the units wheel 82 makes one complete revolution. Likewise, the hundreds wheel 87 will be actuated one space each time the tens wheel 86 makes one complete revolution, and likewise, the thousands wheel 88 will be actuated through the space of one digit each time the hundreds wheel 87 makes one complete revolution.

The pinions 61 and the gear wheels 45 and 46 are each provided with alternating teeth that reach across and one half way across the surface of the periphery, as shown in Fig. 2 in order to permit the teeth of the respective meshing gears to clear a tooth to mesh.

In operation, each time the intake stroke of the pistons of the engine, not here shown, draws the gasoline from the supply tank to the vacuum tank, the suction created thereby will draw inward the diaphragm 10, which is convoluted to make it more flexible. The U-shaped lever 20 is rocked, therefore, upon its fulcrum within the limits of the stops 24 and 25 to thereby actuate the pawl 30 which in turn revolves the ratchet 33 through the space of one tooth. Immediately the suction is released, the diaphragm 10 will be restored to normal position aided by the spring 26. In this latter movement of the diaphragm 10 and the U-shaped lever 20, the pawl 30 will ride over the next adjacent tooth of the ratchet 33. The ratchet 33 will be prevented from turning while the pawl 30 is riding over the next adjacent tooth by the pawl 90 having a trunnion that bears in the bracket 91. A spring 92 is employed to hold the pawl 90 yieldingly against the teeth of the ratchet 33.

Inasmuch, as the number of teeth on the ratchet 33 has been predetermined to correspond with the quantity of gasoline that flows into the vacuum tank, not shown, at one filling, it may be assumed in this instance that there are 33 teeth on the ratchet 33 and that each tooth represents one eleventh of a gallon of gasoline. Furthermore, there are three sets of teeth on the mutilated gear 42 adapted to form in each instance a space to mesh with a tooth on the gear 45. The ratio of the teeth in ratchet 33 to the teeth in mutilated gear 42 is as eleven to one. Therefore, each time the pawl 30 has actuated the ratchet 33 through the space of eleven teeth, the mutilated gear 42 will be revolved through the space of one tooth, whereby the indicator wheels will register one gallon. The wheels 55, 64 and 65 are used to register the gallons per trip or per day and then reset to zero position and the wheels 82, 86, 87 and 88 are used to register the gallons per season.

Figure 8:
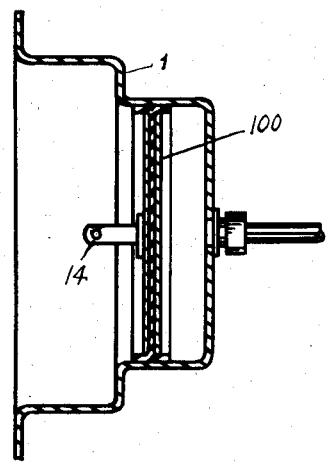
Fig. 8 is a detail view of a modification, showing the parts in section and somewhat smaller scale than the other figures.

Fig. 8 shows a modification embodying a piston 100 that will perform the function of the diaphragm 10 of the former construction.

Figs. 6 and 9 show a still further modification employing an electric circuit. In Fig. 9, the diaphragm 101 is connected to a plunger 102 having a hollow chamber 103 opening into the air tight chamber 104. A coiled spring 105 surrounds the plunger 102 between the diaphragm 101 and the casing —1—. The opposite end of the plunger 102 is pivoted at 111 to a bell crank pawl 106 having a tooth that engages a notch in the bifurcated end of the yoke shaped lever 107. The lever 107 is fulcrumed at 108 to the depending yoke shaped bracket 109. There is also a depending bracket 110 in the lower end of which loosely rests the end 112 of the bell crank pawl 106. When the diaphragm 101 is actuated outward to draw the bell crank pawl 106, the lever 107 will be rocked upon its fulcrum 108 and effect an electric contact between the points 115—116. A further movement outward of the diaphragm 101 will cause the bell crank pawl 106 to turn upon its pivot 111. The portion 112 of the pawl 106 being in contact with the fixed bracket 110 will cause the tooth of the pawl 106 to unhook from the lever 107, whereupon the lever 107 will return to its normal position, as shown in the full lines in Fig. 9. A stop 117 formed integral with the lever 107 abuts against the bracket 110 to limit the return movement of the lever 107. This return movement of the lever 107 will be effected by the coiled spring 114 connecting the bell crank lever 107 with the bell crank pawl 106. As the lever 107 returns to its normal position, the electrical contact between the points 115 and 116 will be broken. Immediately the vacuum is released in the chamber 103, the diaphragm 101, the plunger 102 and the pawl 106 will be returned to normal position by the coiled spring 105.

The electric circuit formed by the contact points 115 and 116 will energize the magnet 121 shown in Fig. 6, which magnet will thereupon attract the armature 122 supported by the yoke shaped lever 123 fulcrumed at 124 to the standard 125. The lever 123 will be rocked and actuate the pawl 126 that is fulcrumed on shaft 127 carried by said lever 123. The actuation of the pawl 126 will rotate the ratchet wheel 128, whereby to move the indicator device to register the given quantity of gasoline used. The ratchet 128 is prevented from turning in a direction opposite from that to which it is actuated by the pawl 126 by another pawl 129. The pawl 126 is held yieldingly in mesh with the teeth of the ratchet 128 by the spring 130 wound about the shaft 127 with one end bearing against the end of the lever 123 and the other against the pawl 126. The lever 123 has an arm 131 to limit its outward movement. A spring 138 returns the lever 123 to normal position.

Fig. 10 shows a still further modification of the electrical parts. Here the plunger 140 is pivotedly connected to the lever 142, such as used in the Stewart vacuum feed system, which lever is rocked upon its fulcrum 143 by a float in the vacuum chamber, not known. The plunger 140 is pivotally connected to the bell crank pawl 144. The pawl 144 has a tooth in engagement with a tooth formed in the U-shaped bell crank lever 145, which is fulcrumed at 146 to a support 147. As the pawl 144 is pulled outward by the plunger 140, an electrical contact will be made at the points 148 and 149. A further movement downward of the pawl 144 will cause the tooth thereof to unhook from the bell crank lever 145 by reason of the member 150 of the pawl 144 coming in contact with the surface 151 of the casing —1—. Immediately the pawl 144 is unhooked from the lever 145, the said lever 145 will return to normal position under the influence of the spring 152, which connects the pawl 144 and the lever 145. The return of the lever 145 to normal position will break the electrical contact made at the points 148 and 149. The stop 153 formed in the lever 145 will engage the support 147 to limit the return movement of the lever 145. When the electrical contact is made through the points 148 and 149, a current will energize the magnet 121 shown in Fig. 6, whereby to actuate the indicating device to register the quantity of gasoline used.

Fig. 11 shows another modification of the electric switch embodying a spring 170 carrying a contact point 171 adapted to make an electric contact with the point 172 of the bracket 173 fastened to the base 174 by bolts 175. The insulation 176 is held in place by the bolts 175. Bracket 173 has a part that rests on the insulation 176 and is held in place also by the bolts 175. The free end of the spring 170 is bent at right angles and rests normally on the insulation 176. The spring 170 is mounted upon the insulated bushing 177 and held in place by the bolt 178. An insulated washer 179 is interposed between the base 174 and the nut 180 to prevent the nut 180 from short circuiting on base 174. A lock nut 181 may be employed to hold nut 180 in place.

The spring 170 is actuated, whereby to effect an electric contact at the points 171 and 172 by the plunger 182 that has a fiber point at 183 to prevent the spring 170 from short circuiting on plunger 182. The plunger 182 is connected to the air valve 184 located in the vacuum tank 185. The air valve is operated by the lever 186 of the vacuum tank 185.

When the float, not here shown, of the vacuum tank 185 rises, it reaches such a height that certain springs, not shown, attached to the lever 186 will cause the same to rock upon its fulcrum 187 into the dotted line position illustrated in Fig. 11. This movement of the lever 186 is effected very quickly causing the lever 186 to hit the upper flange 188 on the valve 184, whereby there is transmitted a vertical motion to the plunger 182 which in turn hits the spring 170 with its fiber point 183. This motion will deflect the spring 170 and effect an electric contact at the points 171 and 172. The electric contact thus made will send an electric impulse to energize the magnet 121, shown in Fig. 6, and thereby operate the indicating device to register the quantity of gasoline used. After the spring 170 is deflected so that the point 171 makes contact with point 172, the plunger 182 falls back to its original position and the contact of points 171 and 172 is broken.

Having thus described my invention what I claim as new and desire to secure by Letters Patent is:

1. In a register, electrical means for actuating the same, said means comprising a spring retracted electrical switch, a bell crank pawl adapted to engage said switch, a plunger connected with said bell crank pawl, whereby the movement of the plunger will be communicated to the switch, and said pawl having its end bent for tripping said pawl, whereby to brake the electrical contact.

2. In a register, electrical means for actuating the same, said means comprising a spring retracted electrical switch, carrying a contact point, a bracket carrying another contact point, a bell crank pawl having a tooth adapted to engage said switch, a plunger connected to said pawl in a pivotal manner, a support for carrying said switch, a spring connecting said pawl and switch, whereby to hold said parts in normal position.

3. In a register, electrical means for actuating the same, said means comprising a U-shaped bell crank lever carrying an electrical contact point, a bracket carrying another electrical contact point, a bell crank pawl having a tooth adapted to engage said U-shaped bell crank lever, whereby to hold said parts in normal position, a plunger connected to said pawl in a pivotal manner, a support for carrying said U-shaped bell crank lever, a spring connecting said pawl and U-shaped lever, whereby to aid in returning said pawl and lever to normal position, and a stop attached to said U-shaped bell crank lever whereby to limit the return movement of said U-shaped bell crank lever.

In testimony whereof I have affixed my signature.

ALFRED D. MAURY.